Patented June 30, 1942

2,288,244

UNITED STATES PATENT OFFICE 2,288,244

SPREAD COMPRISING ANIMAL BODY FAT

Stephan L. Komarik, Chicago, Ill., assignor to The Griffith Laboratories, Inc., Chicago, Ill., a corporation of Illinois No Drawing. Application October 25, 1939, Serial No. 301,157

11 Claims. (Cl. 99—122)

The present invention relates to foods, and in particular to the manufacture of "spreads" for sandwiches and the like.

The tastiness and character of butter, cheese, cream, peanut butter, dressings and the like are due not only to the flavoring ingredients in them, but to the flavored fats that are present and dispersed in emulsified or like forms. The food value depends to a large extent on fat content. These edibles derive their fat largely from dairy products or vegetable oils. Animal body fat enters such edibles to a very limited extent because heretofore there has been difficulty to reduce it to a desirable dispersed form and to maintain it in such condition. There is a large supply of animal body fat available for use, such as back-fat and ham-fat trimmings, beef-fat trimmings, and the like. Heretofore, where animal fat has appeared in food products, such as spreads, it is in minor proportion to a major portion of attendant meat. Animal fat per se is inadequately flavored to permit simple emulsification of it into a tasty form.

The present invention aims to utilize such available fat, to flavor it, to disperse it, and to provide a stable food product having high food value, tastiness, and a suitable consistency to enable it to be used as a spread, a spread being usually plastic.

An object of the invention is to provide a process for dispersing or emulsifying such fats and other ingredients to produce a variety of tasty spreads, which are stable to maintain the dispersion or emulsion and the desired consistency of the spread.

It is also an object of the invention to provide edible spreads which may be stuffed into casings, which may be pasteurized in said casings, then be cooled to present and maintain a desirable consistency and flavor to be used conveniently from time to time directly from the casing, as spreads.

Cheese is an ingredient of the composition, largely because its flavor is in demand for spreads. Cheese is an emulsion containing fat, water and protein, and containing also the complex flavors and agents which characterize the various kinds of cheese. As an emulsion, cheese contains emulsifying or other agents producing stable emulsions, either by nature, or by addition in the process of making cheese. Sodium citrate is one such added agent. To a certain extent cheese may be diluted with additional materials by re-emulsifying a cheese and some added substance to be emulsified, using some of the residual emulsifying agent or power of the cheese. However, the more cheese is so diluted the less stable it becomes.

A small amount of animal fat may be thus emulsified into cheese by reprocessing under suitable conditions. Other products such as peanut butter are dispersions or emulsions which, like cheese, are bases for spreads, and which, like cheese, will permit of some reprocessing to dilute the resulting emulsion. Peanut butter is a solid-in-oil emulsion.

Animal fat to be emulsified must be worked mechanically in the presence of an emulsifying agent to break the fat into minute globules which in dispersing become coated with the emulsifying agent. A suitable machine for so treating fat is known as a silent cutter, which consists of a large bowl with a series of revolving knives operating at very high speed. In this machine fat may be reduced to fine particles, which in the presence of a suitable liquid and an emulsifying agent will form an emulsion. If peanut butter, for example, is included, it adds to the quantity of fat to be emulsified, because the oil-constituent of the peanut butter also must be emulsified to an oil-in-water type of emulsion.

The present invention is not a mere mixture of emulsified fat with other and flavoring edibles. Rather, the invention is a more homogeneous product in which the emulsified materials are of the "in-water" type. For example, animal fat is cut up in the presence of cheese, or peanut butter, or both, so that there is formed an animal fat containing by such cutting action, fat and other elements absorbed from the cheese or peanut butter. For convenience this is called a flavored animal fat. It will also disperse the non-fat content of the cheese or the peanut butter, which is high in protein value. Because the fat will readily absorb flavoring elements it is first permitted to do this before the fat becomes housed as tiny globules in the protective colloid of the emulsifying agent.

Then the flavored animal fat is emulsified into water by the addition of water and of a suitable emulsifying agent. It has been found that approximately equal parts by weight of animal fat and of water may produce a spread of suitable consistency where cheese or a peanut butter, or both are used. Thus, upon emulsifying, the animal fat resulting from mixing the fat with highly flavoring ingredients before emulsifying, becomes the flavored fat of the spread. The residual protein and other content of the material mixed with the animal fat also becomes intimately mixed and a part of the resulting emulsion. Thus the spread becomes a new emulsion, distinguishable from a mixture of emulsified fat and other edibles including cheese or peanut butter.

If desired, other ingredients may be added to the emulsion before or after such emulsification of the mixed fat, such as chopped pickles, pimentos, pecans, walnuts, chopped olives, chopped meat, or the like. Such additional material may be included in the emulsifying agent. To maintain solidity, water absorptive material is also desired in proportion as water is used. Milk powder is an excellent agent to absorb water, and it also gives food value and taste qualities to the product. The lactalbuminous content of dried milk provides emulsifying agent. Coagulatable material may be used which exerts an emulsifying property in the cold and which becomes coagulated on heating, such as certain albumens, for example, that of blood serum.

In Patent No. 2,171,428 there is described an emulsifying composition which combines milk protein, blood serum albumen and emulsifying gums, as a solid solution. This provides a simple emulsifying agent which is useful in the present invention to coagulate and set the spread, to give plasticity, and to add food value. The milk sugar imparts a masked sweetness.

According to said patent a compound is made having the formula:

*Example 1*

|  | Parts by weight |
|---|---|
| Albumen (blood serum) | 4 |
| Skimmed milk powder | 59 |
| Irish moss | 3 |
| Gum karaya | 12 |
| Sodium chloride | 16 |

The above is referred to as "emulsifier."

It is to be understood that the proportions may be varied, and that the salt may be omitted, as described in said patent. When omitted in the emulsifier, it is added to the spread as an ingredient. The emulsifier is a fine powder which is readily useful in variable formulas to make spreads.

The mixed mass swells with cold water forming a gelatinous mass, and emulsification is carried out as this occurs. On heating the gelatinous mass the albumen content coagulates permanently, giving a set to the product containing it. The spread is emulsified in the cold, then cooked, then chilled, to form a stable product.

The cheese normally may contain sodium citrate. It may also be present in the serum albumen, being commonly added to the blood to prevent coagulation. It serves in the spread as a buffer with a stabilizing action. More may be added without harm, and where there is none or small amounts derived from the cheese, or from the emulsifier, more may be added. For example, adding 4 parts by weight to Example 1, or the equivalent amount to the spread, will assure an adequate quantity. The following illustrates the invention.

*Example 2*

|  | Pounds |
|---|---|
| American (Cheddar) cheese | 40 |
| Animal fat | 40 |
| Emulsifier | 24 |
| Water | 40 |
| Chopped sweet pickles | 3 |
| Chopped pimentos | 3 |

*Example 3*

|  | Pounds |
|---|---|
| Cheese | 17½ |
| Animal fat | 25 |
| Peanut butter | 17½ |
| Emulsifier | 15 |
| Water | 25 |
| Chopped pecans or walnuts | 2½ |

*Example 4*

|  |  |  |
|---|---|---|
| Cheese | pounds | 17½ |
| Animal body fat | do | 25 |
| Chopped lean smoked ham | do | 17½ |
| Emulsifier | do | 18 |
| Water | do | 25 |
| Chopped sweet pickle | ounces | 30 |
| Chopped pimentos | do | 30 |

In each of the above Examples 2 to 4, the fat, peanut butter and cheese (as the case may be) are mixed together in the silent cutter to flavor the fat. Any temperature may be used but it is preferred to have the materials between 60° F. and 80° F. When they are quite well broken up, the emulsifier is added, which becomes thoroughly distributed in the mixed fat and flavoring edible product. Then the water is added slowly. This converts the emulsifier ingredient to a colloid gel, and as it forms and as fat is continuously broken down to smaller particles, the fat, oil, and solid particles are coated with the gel and thus emulsified. This may take about 10 minutes. The body of the spread is thus completed, and the added water is taken up by the milk powder and the colloids. The remaining or other ingredients are added to secure uniform mixture. The separate oils and fats amalgamate into composite fat globules for final emulsification, whereby the product is distinguishable from merely mixing a fat emulsion with a cheese emulsion.

The plastic product is stuffed into casings like sausage, or into any other type of container, and in these may be cooked. Where it is put into a casing, it may be immersed in water for cooking, preferably to attain 160° F., the time being dependent on the character of the container. For example, a casing of 12 inches x 2½ inches is cooked for 1½ hours in a 160° F. water bath. Then the product is cooled thoroughly; then chilled, and so maintained, like butter or cheese, for marketing and consumption.

The fat is employed with substantially the same amount of water, and emulsifier to provide the base of the spread. Variation in the other ingredients is determined by flavor, rather than by any critical relation to the consistency of the mass. Thus, where the material which is emulsified with the fat is the major ingredient employed for flavoring the spread exclusive of the emulsifier, it is commonly not less in weight than the weight of fat. However, when it is employed in less amount than the fat, as in Example 4, there is enough of another flavoring ingredient, such as the chopped ham, so that non-emulsified flavoring ingredients plus emulsified flavoring ingredients are at least equal to the amount of animal fat.

These relations are given to enable others readily to modify the formulas given, but are not to be considered as limitations to the invention, as expressed in the appended claims.

I claim:

1. The method of making an edible plastic spread which comprises mixing animal body fat with an edible flavoring material selected from the group consisting of cheese and peanut butter, whereby the fat absorbs material therefrom, and emulsifying the resulting mass with an emulsifier and water to form a plastic emulsion.

2. The method of making an edible plastic spread which comprises mixing animal body fat with an edible flavoring material selected from the group consisting of cheese and peanut butter, whereby the fat absorbs material therefrom, and emulsifying the resulting mass with an emulsifier and a weight of water approximately equal to the weight of fat to form a plastic emulsion.

3. The method of making an edible plastic spread which comprises mixing animal body fat with at least an equal weight of edible flavoring material selected from the group consisting of cheese and peanut butter, whereby the fat absorbs material therefrom, and emulsifying the resulting mass with an emulsifier and a weight of water approximately equal to the weight of said fat to form a plastic emulsion.

4. The method of making an edible plastic spread which comprises mixing animal body fat with a less weight of flavoring edible material selected from the group consisting of cheese and peanut butter, whereby the fat absorbs material therefrom, emulsifying the resulting mass with an emulsifier and a weight of water approximately equal to the weight of fat to form a plastic emulsion, and adding flavoring edible material in an amount by weight at least equal to the difference in weight between the fat and the material selected from said group.

5. The method of making an edible plastic spread which comprises mixing animal body fat with a less weight of flavoring edible material selected from the group consisting of cheese and peanut butter, whereby the fat absorbs material therefrom, emulsifying the resulting mass with an emulsifier and a weight of water approximately equal to the weight of fat to form a plastic emulsion, and adding chopped meat in an amount by weight at least equal to the difference in weight between the fat and the material selected from said group.

6. The method of making an edible plastic spread which comprises mixing animal body fat with about the same weight of cheese, whereby the fat absorbs material from the cheese, and emulsifying the resulting mass with an emulsifying agent and about the same weight of water to make a plastic emulsion.

7. The process of incorporating animal body fat into an edible product with other edible material capable of yielding substance therein to the fat by mixing, which comprises mixing fat with said yielding edible products, and emulsifying the resulting fat with an emulsifier and water to form said fat into a fat-in-water emulsion, whereby said fat is flavored by the absorbed material and whereby the resulting emulsion incorporates the residual ingredients of yielding edible material.

8. An edible spread comprising a water emulsion of a uniform mixture of animal body fat and edible substance selected from the group consisting of cheese and peanut butter, there being animal fat particles in the emulsion which are flavored with material absorbed from the selected substance.

9. An edible spread comprising a water emulsion of a uniform mixture of animal body fat and edible substance selected from the group consisting of cheese and peanut butter, the amount of water and of animal fat being substantially equal, there being animal fat particles in the emulsion which are flavored with material absorbed from the selected substance.

10. An edible spread comprising a water emulsion of a uniform mixture of animal body fat and edible substance selected from the group consisting of cheese and peanut butter, the amounts of water, of animal fat, and of selected substance being substantially equal, there being animal fat particles in the emulsion which are flavored with material absorbed from the selected substance.

11. An edible spread comprising a water emulsion of a uniform mixture of animal body fat and edible substance selected from the group consisting of cheese and peanut butter, there being animal fat particles in the emulsion which are flavored with material absorbed from the selected substance, the emulsion containing heat-coagulated lactalbumen emulsifying agent, coagulated in the finished emulsion.

STEPHAN L. KOMARIK.